(12) United States Patent
Lott et al.

(10) Patent No.: US 7,069,037 B2
(45) Date of Patent: Jun. 27, 2006

(54) SYSTEM AND METHOD FOR FLUID POWER CONTROL OF A REVERSE LINK COMMUNICATION

(75) Inventors: Christopher Gerard Lott, San Diego, CA (US); Jean Au, San Diego, CA (US); Rashid Ahmed Akbar Attar, San Diego, CA (US); Peter J. Black, San Diego, CA (US); Mingxi Fan, San Diego, CA (US); Naga Bhushan, San Diego, CA (US)

(73) Assignee: Qualcomm, Inc., San Diego, CA (US)

( * ) Notice: Subject to any disclaimer, the term of this patent is extended or adjusted under 35 U.S.C. 154(b) by 340 days.

(21) Appl. No.: 10/423,578

(22) Filed: Apr. 25, 2003

(65) Prior Publication Data

US 2004/0214591 A1   Oct. 28, 2004

Related U.S. Application Data

(60) Provisional application No. 60/461,756, filed on Apr. 11, 2003.

(51) Int. Cl.
*H04B 7/00* (2006.01)
*H04Q 7/20* (2006.01)

(52) U.S. Cl. .................. 455/522; 455/67.11; 375/355; 375/360; 370/318

(58) Field of Classification Search ................ 455/522, 455/452.2, 306, 307, 339, 554, 151.2, 67.13; 370/241.1, 465, 335, 342, 331, 318, 333; 375/355, 360
See application file for complete search history.

(56) References Cited

U.S. PATENT DOCUMENTS

| | | | | |
|---|---|---|---|---|
| 6,741,862 | B1* | 5/2004 | Chung et al. | 455/452.1 |
| 2002/0021692 | A1* | 2/2002 | Huh et al. | 370/352 |
| 2002/0136286 | A1* | 9/2002 | Koo | 375/225 |
| 2002/0181410 | A1* | 12/2002 | Bae et al. | 370/252 |
| 2003/0073443 | A1* | 4/2003 | Bae et al. | 455/450 |
| 2003/0093364 | A1* | 5/2003 | Bae et al. | 705/37 |
| 2003/0124988 | A1* | 7/2003 | Bae et al. | 455/88 |
| 2004/0121808 | A1* | 6/2004 | Hen et al. | 455/561 |
| 2004/0202136 | A1* | 10/2004 | Attar et al. | 370/333 |
| 2005/0237935 | A1* | 10/2005 | Chae et al. | 370/232 |

* cited by examiner

*Primary Examiner*—Edan Orgad
(74) *Attorney, Agent, or Firm*—Philip Wadsworth; Sandra L. Godsey; Albert J. Harnois, Jr.

(57) ABSTRACT

A method and apparatus for determining the data rate of a reverse link communication of an access terminal includes receiving a reverse activity bit (RAB) from an access network in the communication system, and passing the RAB to multiple digital filters to produce filtered RABs. The reverse link data rate is determined based on these filtered values of the RABs. From the filtered RAB values a continuous fluid power level is determined each rate update. The access terminal maps the continuous fluid power level to actual physical transmissions by dithering among discrete power levels allowed by the physical layer.

22 Claims, 6 Drawing Sheets

SYSTEM AND METHOD FOR FLUID POWER CONTROL OF A REVERSE LINK COMMUNICATION

This application is a non-provisional application claiming priority to provisional application Ser. No. 60/461,756, filed on Apr. 11, 2003, entitled "System and Method for Fluid Power control of a Reverse Link Communication".

BACKGROUND

The invention relates generally to the field of telecommunications, and more particularly to systems and methods for improving the performance of data transmissions in wireless telecommunications systems.

In a typical wireless voice/data communications system, a base station is associated with an area of coverage. This area is referred to as a sector. Mobile stations, which are within the sector can transmit data to the base station and receive data from the base station. In the context of data communications in particular, base stations may be referred to as access networks (also called access points), and mobile stations may be referred to as access terminals. Access terminals can communicate simultaneously with more than one access network and, as an access terminal moves, the set of access networks with which it communicates may change.

The parameters for communications between a particular access network and a particular access terminal are based in part upon their relative positions and the quality and strength of the signals that are respectively transmitted and received by them. For example, as the access terminal moves farther away from the access network, the strength of the signal received from the access network by the access terminal will decrease. Accordingly, the error rate of the received data will increase. The access network may therefore typically compensate for the increased distance by reducing the rate at which it transmits data to the access terminal. This allows the access terminal to receive and decode the access network's signal with fewer errors. When the access terminal moves closer to the access network, the signal strength increases, so a higher data rate can be used to transmit data to the access terminal.

Similarly, as the access terminal moves farther away from the access network, the strength of the signal received from the access terminal by the access network may decrease, thereby potentially resulting in a higher error rate. Like the access network, the access terminal may typically also compensate for the increased distance by decreasing its data rate to allow the access network to receive the signal with fewer errors. The access terminal may also increase its power output to reduce the error rate if requested by the access network. Again, when the access terminal moves closer to the access network, the stronger signal may support a higher data rate.

In one system, the access terminal is responsible for determining the rate at which data may be transmitted from the access terminal to the access network. This rate is determined based upon a number of factors. The primary factors are the absolute maximum rate at which the access terminal and access network can communicate, the maximum rate based upon the allowable power output of the access terminal, the maximum rate justified by the amount of data which the access terminal has in queue, and the maximum rate allowable based upon ramp-up constraints. In this system, each of these rates presents a hard limit that cannot be exceeded by the selected data rate. In other words, the selected data rate is no higher than the minimum of these four rates.

The first two of these rates (the absolute and power-limited maximum rates) result from physical constraints of the system and are outside the control of the access terminal. The third and fourth rates (the data-justified and ramp-up-limited rates) are variable and are dynamically determined based upon the specific prevailing conditions at the access terminal.

The data-justified rate is essentially the maximum rate that can be justified by the amount of data that is queued for transmission by the access terminal. For example, if the access terminal has 1000 bits in its transmit queue, then a data rate of 38.4 kbps (1024 bits/frame) is justified, but a higher rate of 76.8 (2048 bits/frame) may not be justified. A time frame may be defined in a unit of time, for example in the CDMA2000™ 1xEV-DO system defined by the IS-856 standard, one time frame is 26.666 ms. If there is no data in the access terminal's transmission queue, then no transmission rate at all is justified.

The ramp-up-limited rate is the maximum rate that is allowed, considering the fact that a rapid ramp-up may suddenly increase the interference perceived by other access terminals and may degrade their performance. If the ramp-up of each access terminal is limited, then the level of interference which it causes may change more slowly and the other access terminals can more easily adjust their operating data rates and transmit powers to adapt to the increased interference. It should be noted that the ramp-up-limited rate is also computed to control the ramp-down of data rates. The overall effect is to minimize wide and/or rapid fluctuations in data rates and to thereby stabilize the overall operation of the access network and access terminals in the system.

While the change in the ramp-up-limited rate is controlled (in regard to both increasing and decreasing data rates), the data-justified rate is not. If the access terminal suddenly has enough data to justify a very high rate, the data-justified rate may suddenly increase. If the access terminal runs out of data, the data-justified rate may suddenly drop to zero. Sudden increases in the data-justified rate typically are not problematic because the ramp-up-limited rate is controlled. Since the minimum of the four rates noted above sets a maximum for the selected data rate, the ramp-up-limited rate may control in this situation. Sudden decreases in the data-justified rate may, however, cause the actual data rate to drop since the data-justified rate is lower than the other rates and may therefore control (keeping in mind that the data rate selected for transmission of data over the next frame is the minimum of the four rates).

In prior art systems, if an access terminal has no data to transmit, no data is transmitted. This is certainly intuitive, and conventional wisdom dictates that useful bandwidth should not be wasted by transmitting useless data. One of the problems that results from allowing the data rate to drop precipitously (to zero, for example) is that it takes some amount of time for the data rate to ramp back up. Delays in the transmission of some data may result from the drop and subsequent ramping up of the data rate. This delay is particularly likely in the case of data that is bursty or has discrete arrival processes. One such type of data is real-time video which may comprise 500–1000 byte packets that arrive at the transmit queue at discrete intervals of 60–70 milliseconds. Real-time video is also a notable example of the types of data for which transmission delays are particularly noticeable and therefore unacceptable. Network gaming is another class of applications where data arrivals are sporadic and data latency is a key performance metric. Therefore, there is a need for a method and apparatus for an adaptive determination of data rate for quick ramp up of data rate while minimizing the undesirable effects in a communication system.

SUMMARY

A state variable called the fluid power level is defined for each access terminal. The fluid power level is a continuous power level that is a target power level that takes into consideration sector loading. Actual transmissions occur at the discrete power levels allowed by the physical layer, but by dithering among these discrete levels an average power level equal to the fluid power level can be achieved. In this way, each access terminal's current transmit state is represented by a continuous variable, rather than a discrete rate, as is typical. This allows for a smoothly varying average transmit power as an access terminal increases its power to take advantage of underused system capacity. As a result, simple deterministic power ramp-up values are used by the access terminals to increase power, rather than probabilistic discrete jumps, which reduces variance in performance and improves system controllability.

In one aspect, a method for determining the data rate of a reverse link communication of an access terminal comprises receiving a reverse activity bit, passing the reverse activity bit to a digital filter to produce a filtered reverse activity bit, determining a continuous fluid power level based on the filtered reverse activity bit, and determining the data rate based on the continuous fluid power level.

BRIEF DESCRIPTION OF THE DRAWINGS

Other objects and advantages of the invention may become apparent upon reading the following detailed description and upon reference to the accompanying drawings.

While the invention is subject to various modifications and alternative forms, specific embodiments thereof are shown by way of example in the drawings and the accompanying detailed description. It should be understood, however, that the drawings and detailed description are not intended to limit the invention to the particular embodiment, which is described. This disclosure is instead intended to cover all modifications, equivalents and alternatives falling within the scope of the present invention as defined by the appended claims.

DETAILED DESCRIPTION

Broadly speaking, the invention comprises systems and methods for improving the performance of data transmissions in wireless telecommunications systems by controlling the increase and decrease in the data transmission rate for a reverse link.

Figure 1:
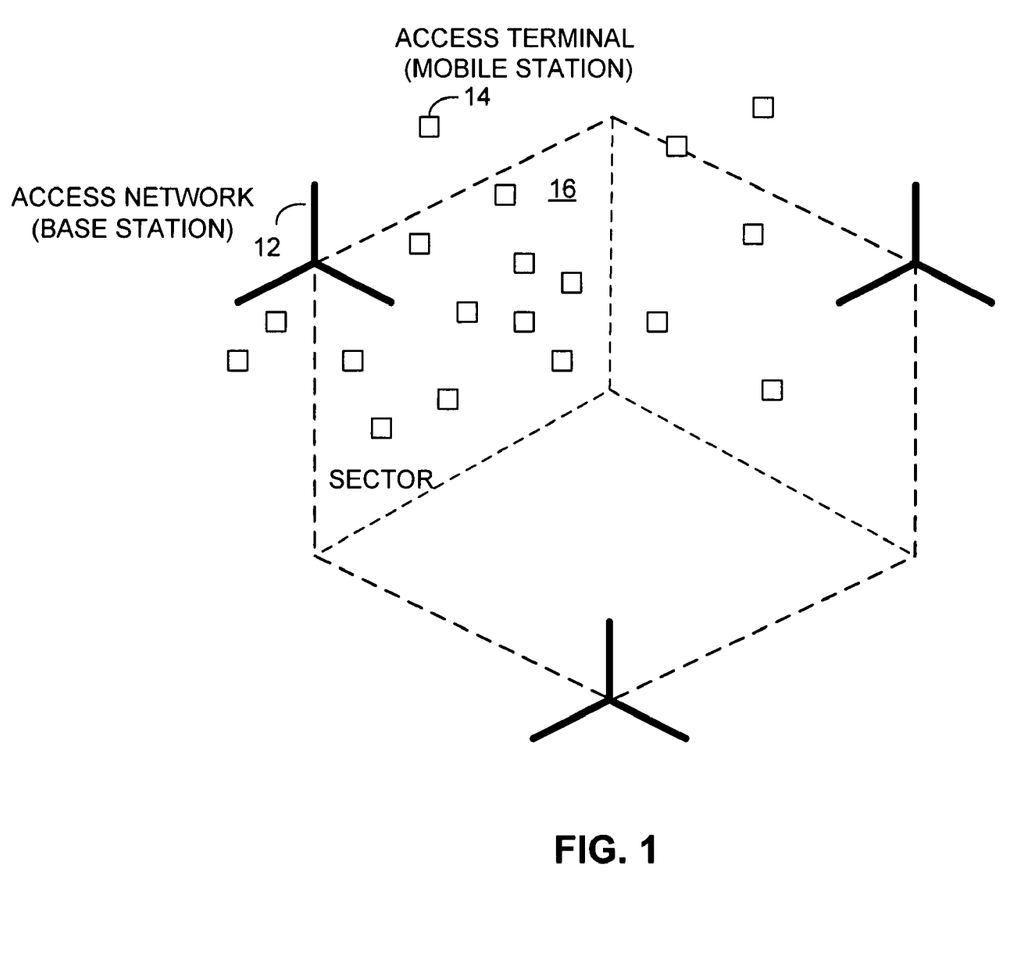
FIG. 1 is a diagram illustrating a portion of a wireless communication system capable of operating in accordance with an embodiment.

Referring to FIG. 1, a diagram illustrating a portion of a wireless communication system in accordance with an embodiment is shown. In this embodiment, the system comprises a plurality of access networks (AN) 12 and a plurality of access terminals (AT) 14. Each access networks 12 communicates with access terminals 14 in the surrounding area. Access terminals may move within the sector, or they may move from a sector associated with one access network to a different sector associated with another access network. The area of coverage is a sector 16. Although the sectors may in actuality be somewhat irregular, and may overlap with other sectors, they are depicted in the figure as being generally delineated by the dotted and dashed lines. It should be noted that, for the sake of clarity, only one of each of the access networks, access terminals and sectors is identified by reference numbers.

Figure 2:
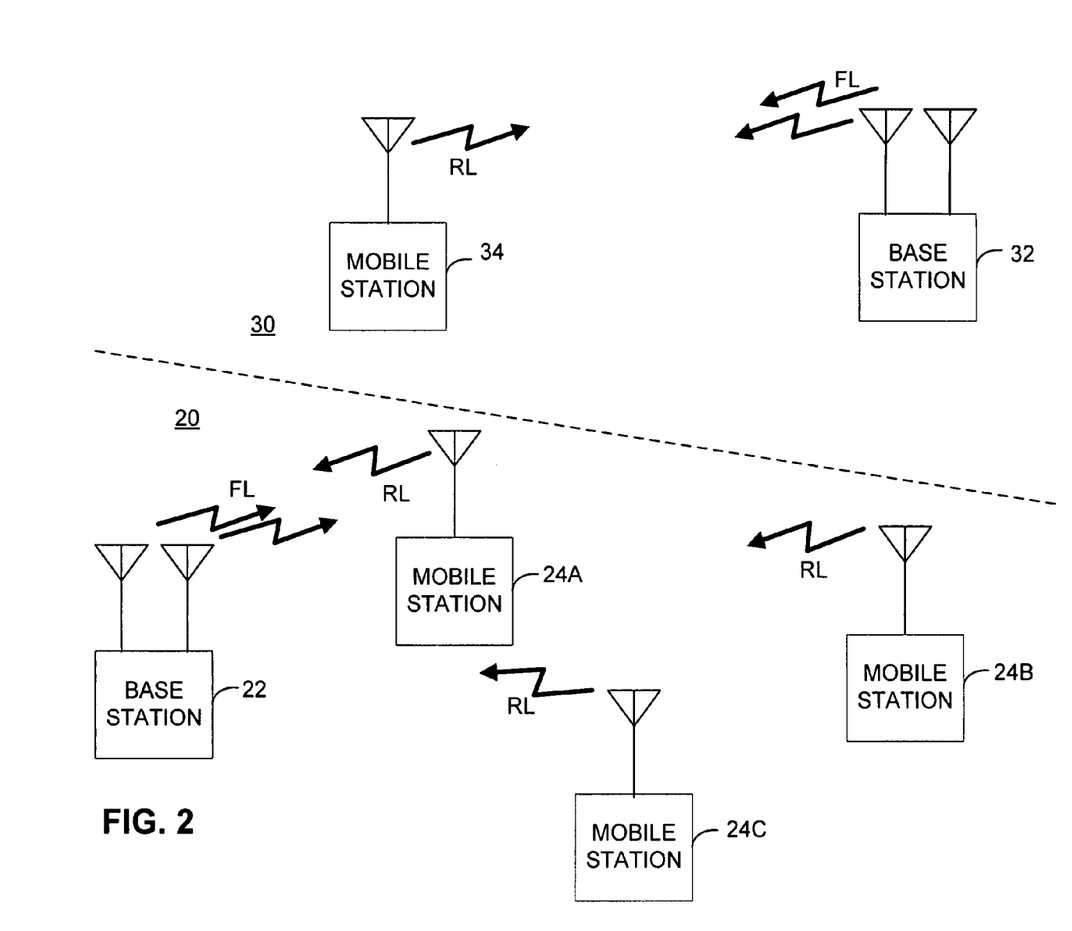
FIG. 2 is a more detailed diagram illustrating the access networks and access terminals in two adjoining sectors of a wireless communication system capable of operating in accordance with an embodiment.

Referring to FIG. 2, a more detailed diagram illustrating the access networks and access terminals in two adjoining sectors of a wireless communication system in accordance with an embodiment is shown. In this system, sector 20 includes an access network 22 and several access terminals 24A–24C. Sector 30 includes an access network 32 and a single access terminal 34. Access networks 22 and 32 transmit data to the access terminals 24 and 34 via what is referred to herein as a Forward Link (FL). Access terminals 24A–24C and 34 transmit data back to access networks 22 and 32 via what is referred to as a Reverse Link (RL).

In a Code Division Multiple Access (CDMA) system that conforms to the "TIA/EIA/IS-95 Mobile Station-Base Station Compatibility Standard for Dual-Mode Wideband Spread Spectrum Cellular System," (IS-95) data packets can be retransmitted on the FL. A technique for FL transmission is described in U.S. Pat. No. 6,574,211, "Method and Apparatus for High Rate Packet Data Transmission," issued Jun. 3, 2003. For example, a data packet can comprise a predetermined number of data units, with each data unit identified by a sequence number. Upon incorrect reception of one or more data units by a mobile station, the mobile station can send a negative acknowledgment (NACK), on the RL ACK channel, indicating the sequence numbers of the missing data units for retransmission from the base station. The base station receives the NACK message and can retransmit the data units received in error.

Automatic Repeat Request (ARQ) refers to a protocol in which the receiver asks the transmitter to resend data. Upon successful decoding of the first half of the frame, the AN can send an acknowledge message (ACK) to the AT to indicate that the AN has successfully decoded the data received in the first half of the frame. Upon unsuccessful decoding of the first half of the frame, the AN can send a negative acknowledge message (NAK) to the AT to indicate that the AN has not successfully decoded the data received in the first half of the frame. A technique for RL ARQ is described in U.S. patent Publication No. 2004-0081124 entitled, "Reverse Link Automatic Repeat Request," Ser. No. 10/280,740, filed Oct. 24, 2002, and is assigned to the assignee of the present invention.

ACK is a message transmitted to indicate that some data has been received correctly. Typically, if the sender does not receive the ACK message after some predetermined time, or receives a NAK, the original data will be sent again.

NAK is a message transmitted to indicate that some data has been received incorrectly, for example the data may have a checksum error. An alternative to sending a NAK is to use only ACK messages, in which case the non-receipt of an ACK after a certain time is counted as a NAK. As used herein, NAK refers to the receipt of a NAK message or the non-receipt of an ACK.

The transmission unit of the physical layer of 1x-EVDO is a physical layer packet. Data is contained in a physical layer packet. In an embodiment, physical layer packets are contained in frames on the reverse link. In an embodiment, frames can be of 26.66 milliseconds (ms) in duration. In an embodiment, a frame can comprise 16 slots, with each slot being 1.66 ms in duration. In an embodiment, a frame can comprise 12 slots. It would be apparent to those skilled in the art that frames may have a variety of durations. It would be apparent to those skilled in the art that a frame can comprise any number of slots.

In an embodiment, physical layer packets are contained in subframes. In an embodiment, four slots comprise a subframe. In an embodiment, the physical layer allows for interlaced data packets. Thus, for example a first data packet may be transmitted in a first subframe, a second data packet in a second subframe, a third data packet in a third subframe, and the first data packet in a fourth subframe if an ACK was not yet received on the first transmission of the first data packet. It would be apparent to those skilled in the art that a frame can comprise any number of subframes. A frame may also be called an interlace.

Figure 3:
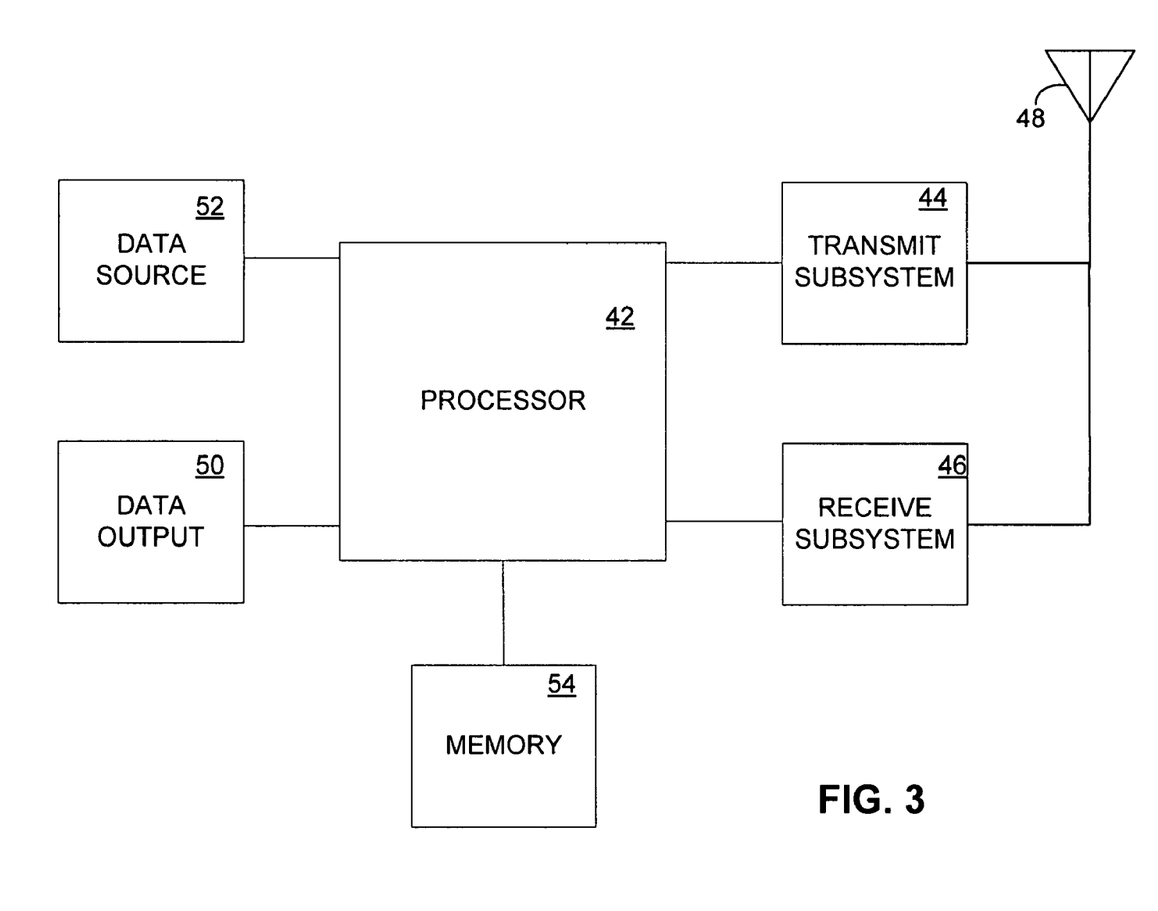
FIG. 3 is a functional block diagram illustrating the structure of an access terminal capable of operating in accordance with an embodiment.

Referring to FIG. 3, a functional block diagram illustrating the structure of an access terminal in accordance with an embodiment is shown. In this embodiment, the access terminal comprises a processor 42 coupled to a transmit subsystem 44 and a receive subsystem 46. Transmit subsystem 44 and receive subsystem 46 are coupled to shared antenna 48. Processor 42 receives data from receive subsystem 46, processes the data, and outputs the processed data via output device 50. Processor 42 also receives data from data source 52 and processes the data for transmission. The processed data is then forwarded to transmit subsystem 44 for transmission over the reverse link. In addition to processing the data from receive subsystem 46 and data source 52, processor 42 is configured to control the various subsystems of the access terminal. In particular, processor 42 controls transmit subsystem 44. The access terminal-based functionality described below is implemented in processor 42. Memory 54 is coupled to processor 42 for storage of data used by the processor.

In one embodiment, the system is a CDMA2000™ 1xEV-DO system. The primary characteristics of this system are defined by the commonly known IS-856 data communication standard. The name "1xEV-DO" refers to the relation to the CDMA2000 family ("1x") and the evolution of the standard ("EV") for data optimized ("DO") operation. The 1xEV-DO system is mainly optimized for access for which a high data throughput on the Forward Link is desirable.

A 1xEV-DO system is designed to communicate data on the forward link at one of 12 different predetermined data rates ranging from 38.4 kbps to 2.4 Mbps (in addition to the null rate). Corresponding data packet structures are defined (specifying such payments as packet duration, modulation type, etc.) for each of these predetermined data rates. In an embodiment, communications on the reverse link take place at one of five different data rates ranging from 9.6 kbps to 153.6 kbps (plus the null rate). Again, data packet structures are defined for each of these data rates. It would be apparent to those skilled in the art that in other embodiments, the reverse link can support any number of data rates.

The present invention relates primarily to the reverse link. Data rates for the reverse link in one embodiment are set forth below in Table 1.

TABLE 1

| Rate | data rate | |
|---|---|---|
| Index | Kbps | bits/frame |
| 0 | 0 | 0 |
| 1 | 9.6 | 256 |
| 2 | 19.2 | 512 |
| 3 | 38.4 | 1024 |
| 4 | 76.8 | 2048 |
| 5 | 153.6 | 4096 |

In another embodiment, there may be more or less data rates as would be apparent to those skilled in the art. For example, in Table 2 shown later, there are many more data rates than shown in Table 1. Table 2 shows data rates on the reverse link of another embodiment.

As indicated above, the present 1xEV-DO-based system is built on CDMA standards. Data that is transmitted over the reverse link is consequently code division multiplexed. That is, the data corresponding to each access terminal is identified by a corresponding code. Each code defines a communication channel. Thus, data from any or all of the access terminals can be transmitted at the same time, and the access network can distinguish the different sources of the data using the codes.

Code Division Multiple Access (CDMA) transmissions are interference limited. In other words, the amount of data that can be transmitted is limited by the amount of interference that is present in the environment. While there is a certain amount of interference caused by background or thermal noise, the primary sources of interference with an access terminal's transmissions are the other access terminals in the area. If there are few other access terminals and they are transmitting little data, there will be little interference, so it may be possible to transmit data at a high data rate. On the other hand, if there are many other access terminals that are transmitting large aggregate amounts of data, the level of interference will be higher, and it may only be possible to use a very low data rate for reverse link transmissions.

A mechanism must therefore be provided for determining appropriate data rates for each of the access terminals. Typical CDMA wireless communication systems use a small set of data rates for all of the access terminals. A set of two possible data rates is typical in the systems operating in accordance with the IS-95 standard. Certain CDMA communication systems providing voice and data communications use some form of a centralized control, whereby the information needed to allocate rates is gathered in one central location, and then rate allocations are transmitted back to each access terminal. The difficulties with a centralized control are: 1) Computation of optimal rates for all access terminals can be difficult and computationally intensive, 2) Communication costs for control signaling to and from the access terminals can be excessive, and 3) The validity of the "optimal" rate allocation is questionable once delays and uncertainty about the future needs of the network and its behavior are considered.

One way in which the present system differs from typical systems is that the calculation of the data rates for the access terminals is the responsibility of each individual access terminal. In other words, it is distributed rather than centralized. The appropriate data rate for a particular access terminal is determined by that access terminal itself using a reverse link Mac algorithm. ("Mac" is an industry term for multi-access communications.) The reverse link Mac algorithm is discussed further.

When a particular access terminal is calculating the data rate for its reverse link, it obviously would want to select the highest possible rate. There may, however, be other access terminals in the sector. These other access terminals would also try to transmit their data at the highest possible rate. Since the power required to transmit the data is roughly proportional to the data rate, increasing the data rates of each access terminal would also increase the power of their transmissions. Each access terminal's transmissions would then present an increasing amount of interference to the other access terminals. At some point, there would be so much interference that none of the access terminals would be able to transmit its data with an acceptable error rate.

It is therefore useful for the access terminals to have information on the level of interference present in the system. If the level of interference is relatively low, the access terminals can increase their data rates to some extent without causing a significant adverse impact on the overall performance of the system. If the level of interference is too high, however, increases in the access terminals' data rates may have a significant adverse impact.

The overall level of interference is therefore tracked in one embodiment by the access network. The access network is configured to simply determine whether the overall level of interference is above or below a threshold value. If the interference level is below the threshold, indicating a low level of activity, the access network sets a Reverse Activity Bit (RAB) to −1. It would be apparent to those skilled in the art that another value can be used to represent a low level of activity. For example a value of zero can be used to represent a low level of activity. The RAB is also sometimes referred to as a "busy bit." If the interference level is above the threshold, indicating a high level of activity, the access network sets RAB=1. It would be apparent to those skilled in the art that another value can be used to represent a high level of activity. The RAB is then communicated to each of the access terminals to inform them of the level of activity/interference in the system.

In one embodiment, the overall interference level is computed by summing the power of each access terminal's reverse link transmissions and dividing by the level of thermal, or background, noise in the environment. The quotient is then compared to a threshold. If the quotient is more than the threshold, then the interference level is considered to be high, and the RAB is set to 1. If the quotient is less than the threshold, then the interference level is considered to be low, and the RAB is set to −1.

Because the performance of reverse link data communications is dependent upon the data rate and the level of interference in the system, it is necessary to take into account the level of interference in computing the appropriate data rate. The data rate calculation in a reverse link Mac algorithm therefore takes into account the interference level as provided to the access terminals in the form of the RAB, in accordance with various aspects of the invention. The reverse link Mac algorithm also takes into account factors such as the needs of the access terminal and the physical constraints of the system. Based upon these factors, the data rate for each access terminal is calculated once each subframe.

A method and apparatus for determining the data rate of a reverse link communication of an access terminal includes receiving an RAB from an access point in the communication system, and passing the RAB to a digital filter to produce a filtered RAB.

In an embodiment, an RAB corresponds to a sector of an access network and is set at the access network at every slot. For every slot, an access terminal decodes the RAB. In an embodiment, an RAB is passed to a digital filter with short time constant $t_s$ to produce a Quick Reverse Activity Bit (QRAB). In an embodiment, an RAB is passed to a digital filter with a long time constant $t_L$ to produce a Filtered Reverse Activity Bit (FRAB). The QRAB and the FRAB are defined with respect to the RAB and a time constant. QRAB and FRAB provide an indication of the power loading of the system. QRAB provides an indication of the short-term loading of the system. FRAB provides an indication of the long-term loading of the system.

QRAB is RAB filtered with short time constant $t_s$. In an embodiment, $t_s$ is four time slots. In one embodiment, QRAB is determined every slot, but the access terminal uses QRAB values as they occur on the access terminal's subframe boundary, which is every four slots.

FRAB is RAB filtered with a long time constant $t_L$. In an embodiment, $t_L$ is 256 time slots. In an embodiment, FRAB is determined every 256 slots.

It would be apparent to those skilled in the art that a filtered time constant and usage interval of an RAB filtered value do not have to be the same. Thus, in other embodiments, the sampling rate of RAB filtered values can be independent of a filtered time constant.

In an embodiment, the reverse link data rate is determined based on a filtered value of the RAB. Furthermore, a processor in the access terminal may determine whether the access terminal is in an idle mode, and passing a non-busy state value of the RAB to the digital filter when the access terminal is in the idle mode. This results in a short-term priority given to recently idle access terminals, which may be desirable to reduce the delay of low-rate bursty sources.

In an embodiment, the reverse link data rate is determined based on a bank of filters for the RAB.

Figure 4:
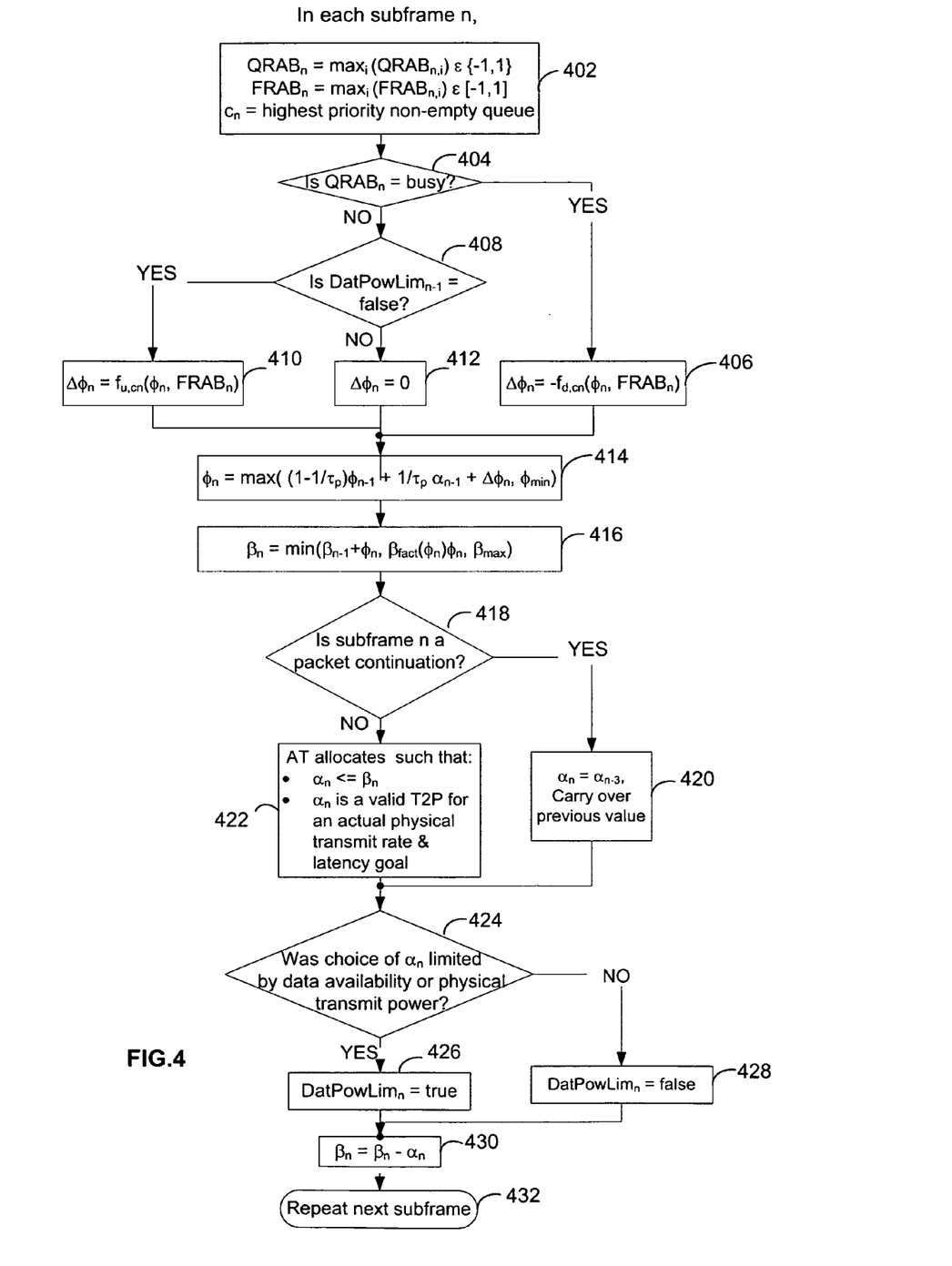
FIG. 4 is a flowchart for determining the data rate of the reverse link in accordance with an embodiment.

FIG. 4 shows a flowchart illustrating a reverse link Mac algorithm in accordance with an embodiment having two filters for the RAB. The receive subsystem 46 of FIG. 3 receives the RAB. The processor 42 of FIG. 3 executes the reverse link Mac algorithm.

The reverse link Mac algorithm is executed for each subframe n. The reverse link Mac algorithm is executed on an access terminal and enables autonomous rate change by the access terminal based on the RAB broadcast by each sector in the active set.

In step 402, $QRAB_n$ is set to the maximum QRAB of all sectors i in the active set, i.e., $(\max_i(QRAB_{n,i}))$, wherein $QRAB_{n,i}$ is a discrete quantity, $QRAB_{n,i} \in \{-1, 1\}$. $FRAB_n$ is set to the maximum FRAB of all sectors i $(\max_i(FRAB_{n,i}))$, wherein $FRAB_{n,i}$ is a continuous quantity, $FRAB_{n,i} \in [-1, 1]$. $C_n$ is set to a highest priority non-empty queue representing a highest priority data class. The flow of control proceeds to step 404.

In step 404, a check is made to determine whether $QRAB_n$ is busy. If $QRAB_n$ is busy, then the flow of control proceeds to step 406. In step 406, a power level delta $\Delta\phi_n$, which is a ramping value, is determined based on the equation $\Delta\phi_n = -f_{d,cn}(\phi_n, FRAB_n)$. $f_{d,cn}$ is a down function that takes a current Traffic-to-Pilot (T2P) power level $\phi_n$ and long-term sector loading $FRAB_n$ as its arguments and is a function of the highest priority data class $c_n$. $\phi_n$ is an access terminal's continuous state variable for the current T2P power level. $\phi_n$ is the current power resource allocation for the access terminal and is also called fluid power herein.

If in step 404, $QRAB_n$ is not busy, then the flow of control proceeds to step 408. In step 408, a check is made to determine whether the access terminal was not data or power limited in the last subframe, i.e., $DatPowLim_{n-1}$=false. If the access terminal was not data or power limited, then the flow of control proceeds to step 410, otherwise the flow of control proceeds to step 412. An access terminal is data limited if it does not have the data required to transmit the rate allocated by the reverse link Mac algorithm on the reverse link. An access terminal is power limited if it does not have the power required to transmit the rate allocated by the reverse link Mac algorithm on the reverse link.

In step 410, in which QRAB is not busy, a power level delta $\Delta\phi_n$ is determined based on the equation $\Delta\phi_n = f_{u,cn}(\phi_n, FRAB_n)$. $f_{u,cn}$ is an up function that takes a current T2P power level $\phi_n$ and long-term sector loading $FRAB_n$ as its arguments, and is a function of the highest priority data class $c_n$.

In step 412, a power level delta $\Delta\phi_n$ is set to zero. From steps 406, 410, and 412, the flow of control proceeds to step 414.

In step 414, fluid power $\phi_n$ is updated based on the equation $\phi_n = \max((1-1/\tau_p)\phi_{n-1} + 1/\tau_p \alpha_{n-1} + \Delta\phi_n, \phi_{min})$, wherein $\tau_p$ is a T2P level filter time constant, $\alpha_{n-1}$ is the transmitted T2P for the last subframe, and $\phi_{min}$ is a minimum T2P for an access terminal. In an embodiment, $\tau_p$ is 12 subframes. To be more precise, $\alpha_{n-1}$ is the actual discrete T2P for the last subframe. The terms $(1-1/\tau_p)\phi_{n-1} + 1/\tau_p \alpha_{n-1} + \Delta\phi_n$ comprise an Infinite Impulse Response (IIR) filter of the transmitted power with a ramping function $\Delta\phi_n$. a is also called a transmitted T2P power level. From step 414, the flow of control proceeds to step 416.

The reverse link Mac algorithm uses a token bucket to match the average of transmitted power to the fluid power level $\phi_n$. The fluid power level $\phi_n$ is continuous, whereas transmitted power is discrete. Transmitted power is restricted to actual discrete physical T2P levels. Thus, to map between the fluid power level and the discrete transmitted power level, a token bucket is utilized to dither between physical power levels and regulate the transmitted data rate. The token bucket is input with fluid power $\phi_n$ and is decreased by allocated transmitted power.

Figure 5:
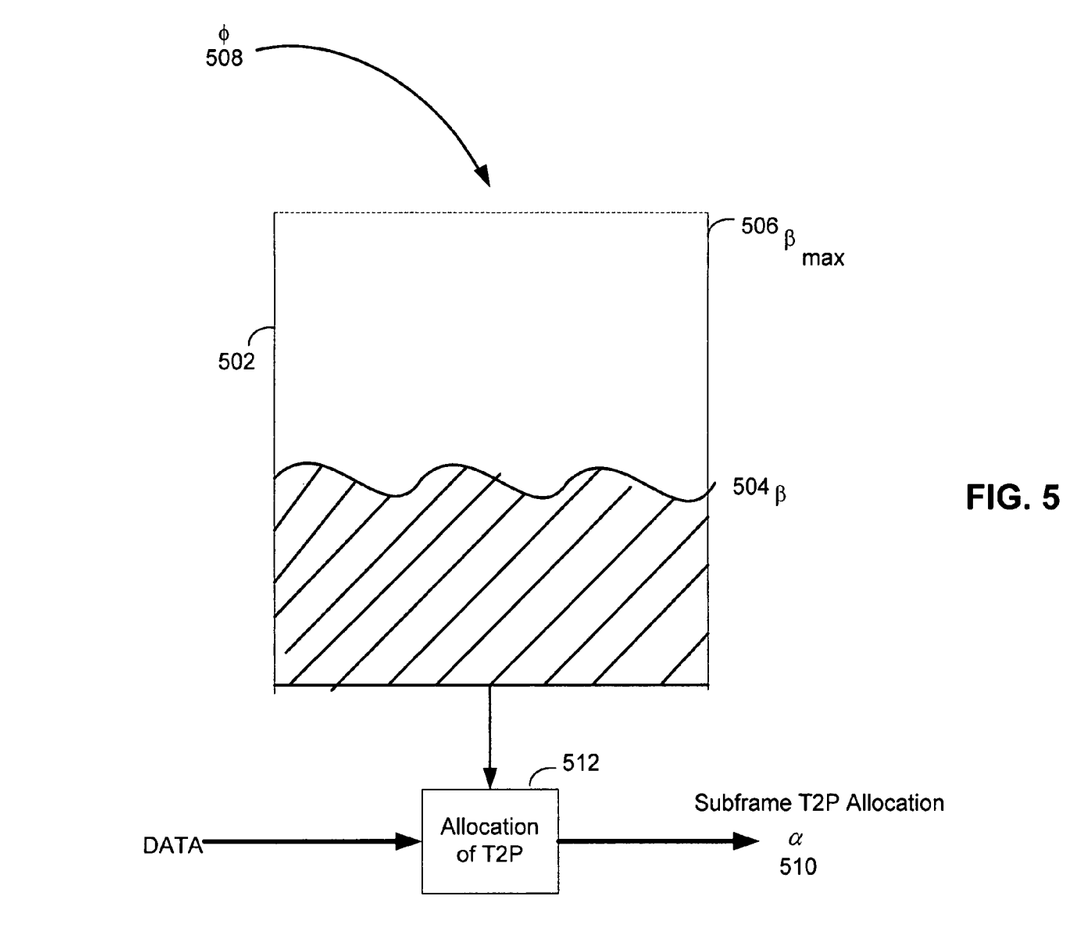
FIG. 5 illustrates the concept of a token bucket in accordance with an embodiment.

FIG. 5 illustrates the concept of a token bucket 502 in accordance with an embodiment. The token bucket level 504 is denoted by $\beta$. The upper limit of the token bucket level 506 is $\beta_{max}$, the token bucket level maximum. The fluid power level $\phi_n$ 508 is added to the token bucket. Transmitted power $\alpha_n$ 510 is subtracted from the token bucket 504. $\alpha_n$ 510 is the T2P power allocation for subframe n, which enables a corresponding data rate.

Block 512 in the token bucket represents the allocation of T2P and data to a packet for transmission. That is, at each new interlace allocation, the access terminal can decide how many bits to put in the packet, and at what Traffic-to-Pilot ratio T2P to transmit the packet. The box indicates that these two quantities are chosen and put together.

In step 416, a token bucket level $\beta_n$ is determined based on the equation $\beta_n = \min(\beta_{n-1} + \phi_n, \beta_{fact}(\phi_n)\phi_n, \beta_{max})$. $\beta_{n-1}$ is the bucket level of the last subframe. $\beta_{max}$ is the maximum size of the token bucket. $\beta_{fact}(\phi_n)$ denotes a multiplicative factor of the fluid power $\phi_n$. $\beta_{fact}(\phi_n)$ regulates how much the fluid power $\phi_n$ can accumulate in the bucket between allocations of transmit power. For example, $\beta_{fact}(\phi_n)=2$ means that a transmit power allocation can be at most twice the current fluid power.

In an embodiment, $\beta_{fact}(\phi_n)$ is a decreasing function of $\phi_n$, as burstiness of data is more restricted at higher $\phi$s. From step 416, the flow of control proceeds to step 418.

In step 418, a check is made to determine whether the current subframe n is a packet continuation. If the current subframe n is a continuation of a packet, then the flow of control proceeds to step 420, otherwise the flow of control proceeds to step 422.

In step 420, the transmitted power an is set to a previous value $\alpha_{n-3}$ since the current subframe n is a continuation of a packet.

In step 420, the transmitted power $\alpha_n$ is set to a previous value for a given interlace, since the current subframe n is a continuation of a packet. In an embodiment with three interlaces, $\alpha_n = \alpha_{n-3}$.

In step 422, the access terminal allocates the transmitted power $\alpha_n$ such that $\alpha_n <= \beta_n$ and $\alpha_n$ is a valid T2P power level for an actual physical transmit rate and latency goal. Allocating the transmitted power $\alpha_n$ such that $\alpha_n <= \beta_n$ means that the amount of power allocated for transmitted power $\alpha_n$ cannot be more than the amount of power contained in the token bucket $\beta_n$.

It is often desirable to allocate transmit power high enough to meet a latency goal. Data may have a delay deadline requirement. Such data has to be transmitted within a period of time. Such data has to meet a latency goal. To meet the latency goal, the transmitted power has to be high enough to transmit the data within its deadline requirement. Power is allocated to transmitted power such that its corresponding data rate and termination goal enables data to be transmitted within its deadline requirement.

Table 2 shown below is a table of effective throughput versus payload size (bits) and termination time (slots) in accordance with an embodiment. In another embodiment, there may be more or less data rates as would be apparent to those skilled in the art.

At allocation, the access terminal chooses the T2P based on a termination goal of 4, 8, 12, or 16 slots. This termination goal for the packet can also be called the "latency goal," as the latency seen by the packet is affected by how long the transmission takes.

TABLE 2

| Payload Size (bits) | Effective Data Rate (kpbs) | | | |
|---|---|---|---|---|
| | After 4 slots | After 8 slots | After 12 slots | After 16 slots |
| 128 | 19.2 | 9.6 | 6.4 | 4.8 |
| 256 | 38.4 | 19.2 | 12.8 | 9.6 |
| 512 | 76.8 | 38.4 | 25.6 | 19.2 |
| 768 | 115.2 | 57.6 | 38.4 | 28.8 |
| 1024 | 153.6 | 76.8 | 51.2 | 38.4 |
| 1536 | 230.4 | 115.2 | 76.8 | 57.6 |
| 2048 | 307.2 | 153.6 | 102.4 | 76.8 |
| 3072 | 460.8 | 230.4 | 153.6 | 115.2 |
| 4096 | 614.4 | 307.2 | 204.8 | 153.6 |
| 6144 | 921.6 | 460.8 | 307.2 | 230.4 |
| 8192 | 1228.8 | 614.4 | 409.6 | 307.2 |

From steps 420 and 422, the flow of control proceeds to step 424. In step 424, a check is made to determine whether the choice of $\alpha_n$ is limited by data availability or available physical transmit power. If there is no data to send, then $\alpha_n$ is data limited. If the allocated transmitted power $\alpha_n$ is higher than the available physical transmit power, then the access terminal is limited by the available physical transmit power. If the choice of $\alpha_n$ is limited by data availability or available physical transmit power, then the flow of control proceeds to step 426 and DataPowLim$_n$ is set to true, otherwise the flow of control proceeds to step 428 and the DataPowLim$_n$ is set to false. From steps 426 and 428, the flow of control proceeds to step 430.

In step 430, the token bucket $\beta_n$ is updated with the outward flow. The allocated transmitted power is subtracted from the token bucket, i.e., $\beta_n = \beta_n - \alpha_n$. From step 430, the flow of control proceeds to step 432, wherein the reverse link Mac algorithm is repeated for the next subframe.

Processed data is forwarded to transmit subsystem 44 for transmission over the reverse link at the allocated transmitted power $\alpha_n$.

Although the reverse link Mac algorithm of FIG. 4 uses only two filters for the RAB, it would be apparent to one skilled in the art that in another embodiment any number of filters for the RAB can be used to determine a continuous fluid power level.

Figure 6:
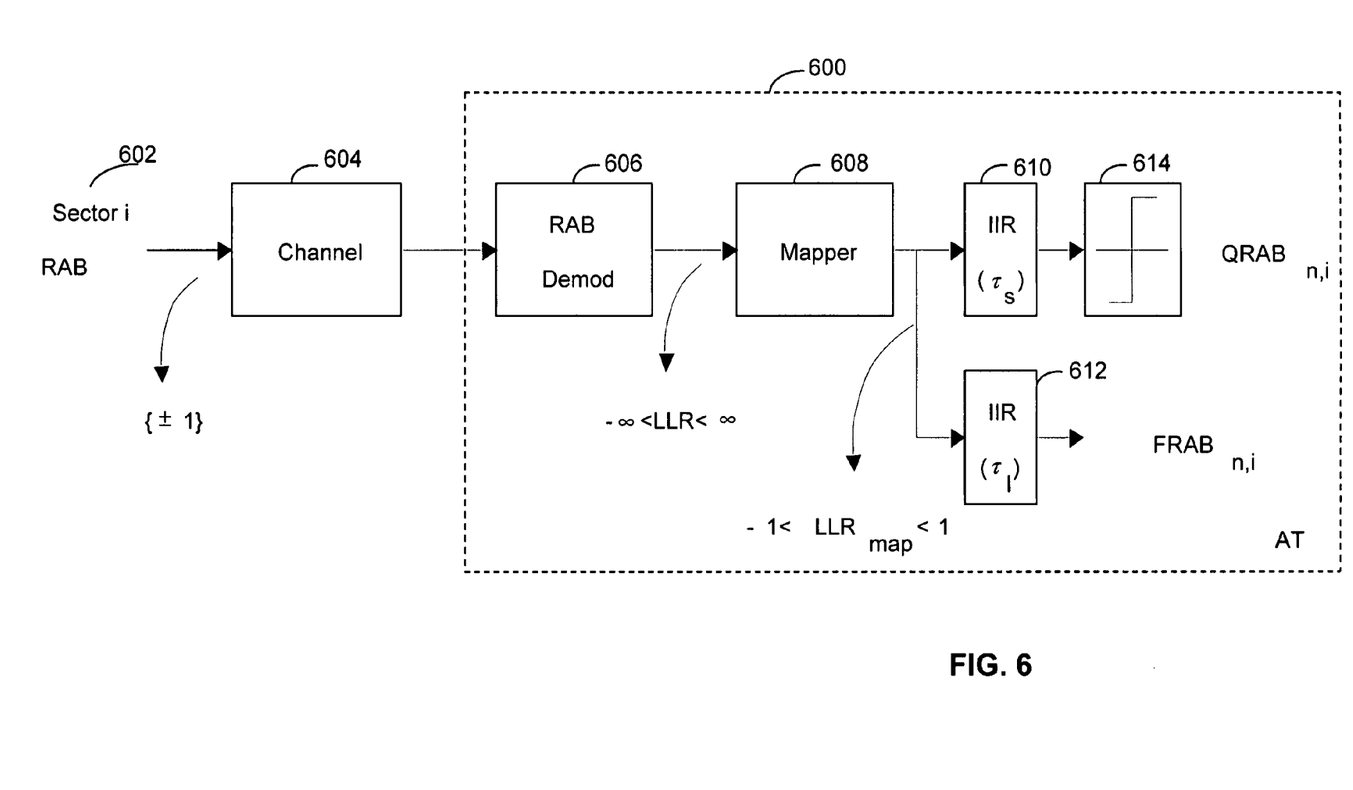
FIG. 6 is a block diagram of Quick Reverse Activity Bit (QRAB) and Filtered Reverse Activity Bit (FRAB) generation in accordance with an embodiment.

FIG. 6 is a block diagram of QRAB and FRAB generation in accordance with an embodiment. Each sector determines its load level and uses its load level to set an RAB. The RAB is updated and broadcast every slot.

Sector i 602 sends an RAB (RAB $\in \{\pm 1\}$) through a wireless communication channel 604, which is received by an RAB demodulator 606 of an access terminal 600. The RAB demodulator 606 demodulates a received signal containing the RAB and outputs a Log Likelihood Ratio ($-\infty < LLR < \infty$). In an embodiment, an LLR is mapped by a mapper 608 before filtering to avoid a single large value from biasing filter output. In an embodiment, a hyperbolic tangent function is used for mapping. In an embodiment, the hyperbolic tangent function is $y = (e^{x/2} - e^{-x/2})/(e^{x/2} - e^{-x/2})$, $-1 < y < 1$ for the real x. The mapping is a minimum mean-square error solution for 1-slot RAB estimation. The mapper 608 output is fed into an IIR filter 610 and IIR filter 612 every slot. In an embodiment, the IIR filter 610 has short time constant $\tau_s$ of four slots. The QRAB is sampled at sampler 614 every subframe n.

In every subframe, each access terminal determines the value of QRAB for each sector in its active set, which is the hard-limited output of the IIR filter for each sector. The AT combines the QRAB from all sectors in its active set and adjusts its data rate accordingly.

FRAB is a measure of sector loading similar to QRAB, but obtained by passing the sector RAB through an IIR filter with a longer filter time constant $\tau_L$. In an embodiment, $\tau_L$ is 256 slots. While QRAB is relatively instantaneous, FRAB provides a longer-term sector loading information.

The functions for determining the power level delta $\Delta\phi_n$, which is a ramp-up value, are functions that take into consideration the priority of data classes $c_n$. In an embodiment, the data classes are service classes within a Quality of Service (QoS) framework. In one embodiment, the QoS framework is Differentiated Services (DiffServ). An embodiment includes, but is not limited to three service classes: (1) expedited forwarding (EF); (2) Assured Forwarding (AF); and (3) Best Effort (BE). In an embodiment, these three classes are handled in priority ordering, where EF has high priority, AF has medium priority and BE has low priority. The RLMac receives these service classes in three separate queues.

The functions for determining the power level delta $\Delta\phi_n$, $f_{d,cn}(\phi_n, FRAB_n)$ and $f_{u,cn}(\phi_n, FRAB_n)$ are parameterized by the data class $c_n$. $c_n$ is the class of highest priority at the access terminal with either a non-empty queue. Parameterizing the functions by data class enables specification of the relative priority of different data flows across access terminals.

$f_{d,cn}(\phi_n, FRAB_n)$ and $f_{u,cn}(\phi_n, FRAB_n)$ are two-dimensional piecewise linear functions parameterized by c. In an embodiment, 11 T2P points and three FRAB points provide 33 points at which $f_{d,cn}$ and $f_{u,cn}$ are each specified explicitly. The points for the down and up functions, respectively, are specified as $D_{1,c}, D_{2,c}, D_{3,c}, \ldots$, and $U_{1,c}, U_{2,c}, U_{3,c}, \ldots$, where each U and D is an 11×1 vector. The access terminal performs bilinear interpolation. The highest specified FRAB point may be less than unity at which point the value saturates.

In an embodiment, $f_{d,cn}(\phi_n, FRAB_n)$ is monotonic non-decreasing in FRAB for fixed $\phi_n$.

In an embodiment, $f_{u,cn}(\phi_n, FRAB_n)$ is monotonic non-increasing in FRAB for fixed $\phi_n$.

In an embodiment, the ratio $f_{u,cn}(\phi_n, FRAB_n)/f_{d,cn}(\phi_n, FRAB_n)$ is monotonic decreasing in $\phi_n$ for fixed $FRAB_n$.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

While the present invention has been described with reference to particular embodiments, it should be understood that the embodiments are illustrative and that the scope of the invention is not limited to these embodiments. Many variations, modifications, additions and improvements to the embodiments described above are possible. It is contemplated that these variations, modifications, additions and improvements fall within the scope of the invention as detailed within the following claims.

What is claimed is:

1. A method for determining the data rate of a reverse link communication of an access terminal comprising:
  receiving a reverse activity bit;
  passing said reverse activity bit to a first digital filter to produce a filtered reverse activity bit;
  determining a continuous fluid power level based on said filtered reverse activity bit; and
  determining the data rate based on said continuous fluid power level.

2. The method of claim 1, wherein said data rate is determined based on determining a traffic-to-pilot power level and a bit allocation, said traffic-to-pilot power level and said bit allocation determined based on said continuous fluid power level.

3. The method of claim 1, wherein said reverse activity bit is received each time slot.

4. The method of claim 1, wherein said first digital filter has a short time constant reflecting short-term power loading of a communication system.

5. The method of claim 1, wherein said first digital filter has a long time constant reflecting long-term power loading of a communication system.

6. The method of claim 1, further comprising transmitting data at said data rate, wherein said data rate is determined by mapping said continuous fluid power level to discrete power levels.

7. The method of claim 6, wherein said continuous fluid power level is mapped to discrete power levels such that an average of said discrete power levels over a period of time approximates an average of said fluid power level over said period of time.

8. The method of claim 1, further comprising passing said reverse activity bit to a second digital filter to produce a second filtered reverse activity bit, wherein said continuous fluid power level is also based on said second filtered reverse activity bit.

9. The method of claim 8, wherein said first digital filter has a short time constant reflecting short-term power loading of a communication system and said second digital filter has a long time constant reflecting long-term power loading of said communication system.

10. The method of claim 9, wherein said continuous fluid power level is determined based on a function parameterized by said second filtered reverse activity bit.

11. The method of claim 9, wherein said continuous fluid power level is determined based on a down function parameterized by said second filtered reverse activity bit if said first filtered reverse activity bit indicates busy short-term power loading of said communication system.

12. The method of claim 11, wherein said down function is further parameterized by a previous continuous fluid power level.

13. The method of claim 9, wherein said continuous fluid power level is determined based on an up function parameterized by said second filtered reverse activity bit if said first filtered reverse activity bit does not indicate busy short-term power loading of said communication system and data and power are not limited.

14. The method of claim 13, wherein said up function is further parameterized by a previous continuous fluid power level.

15. The method of claim 9, further comprising transmitting data at said data rate, wherein said data rate is determined by mapping said continuous fluid power level to discrete power levels.

16. The method of claim 15, wherein said continuous fluid power level is mapped to discrete power levels such that an average of said discrete power levels over a period of time approximates an average of said fluid power level over said period of time by utilizing a token bucket.

17. The method of claim 15, wherein said continuous fluid power level is mapped to discrete power levels using a token bucket, said continuous fluid power level is added to said token bucket and a mapped discrete power level is subtracted from said token bucket.

18. The method of claim 17, wherein said mapped discrete power level does not exceed a cumulative amount of said continuous power level added to said token bucket.

19. The method of claim 17, wherein a cumulative amount of said continuous power level added to said token bucket does not exceed a token bucket level maximum.

20. An apparatus for determining the data rate of a reverse link communication of an access terminal comprising:
means for receiving a reverse activity bit;
means for passing the reverse activity bit to a digital filter to produce a filtered reverse activity bit;
means for determining a continuous fluid power level based on said filtered reverse activity bit; and
means for determining the data rate based on said continuous fluid power level.

21. An apparatus for determining the data rate of a reverse link communication of an access terminal comprising:
a receive subsystem for receiving a reverse activity bit; and
a processor for applying a digital filter to said reverse activity bit to produce a filtered reverse activity bit, determining a continuous fluid power level based on said filtered reverse activity bit, and determining a data rate based on said continuous fluid power level.

22. A computer readable media embodying a method for determining a data rate, the method comprising:
receiving a reverse activity bit;
passing the reverse activity bit to a digital filter to produce a filtered reverse activity bit;
determining a continuous fluid power level based on said filtered reverse activity bit; and
determining the data rate based on said continuous fluid power level.

* * * * *